Mar. 13, 1923.
E. G. LOOMIS ET AL.
MACHINE FOR MAKING BRUSHES
Filed Feb. 24, 1917   14 sheets-sheet 9
1,448,489
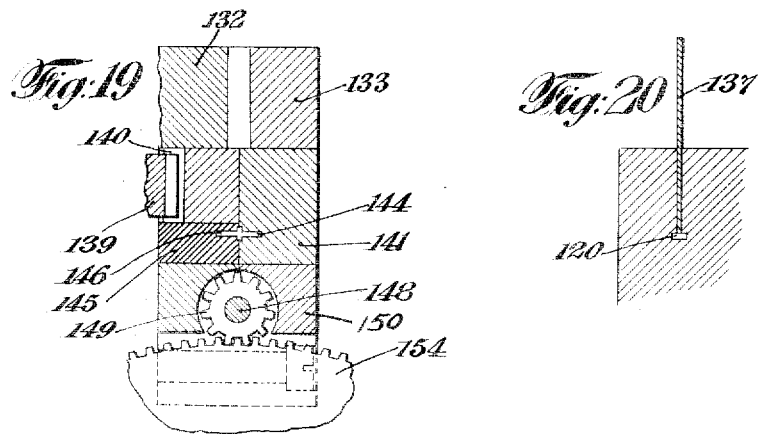
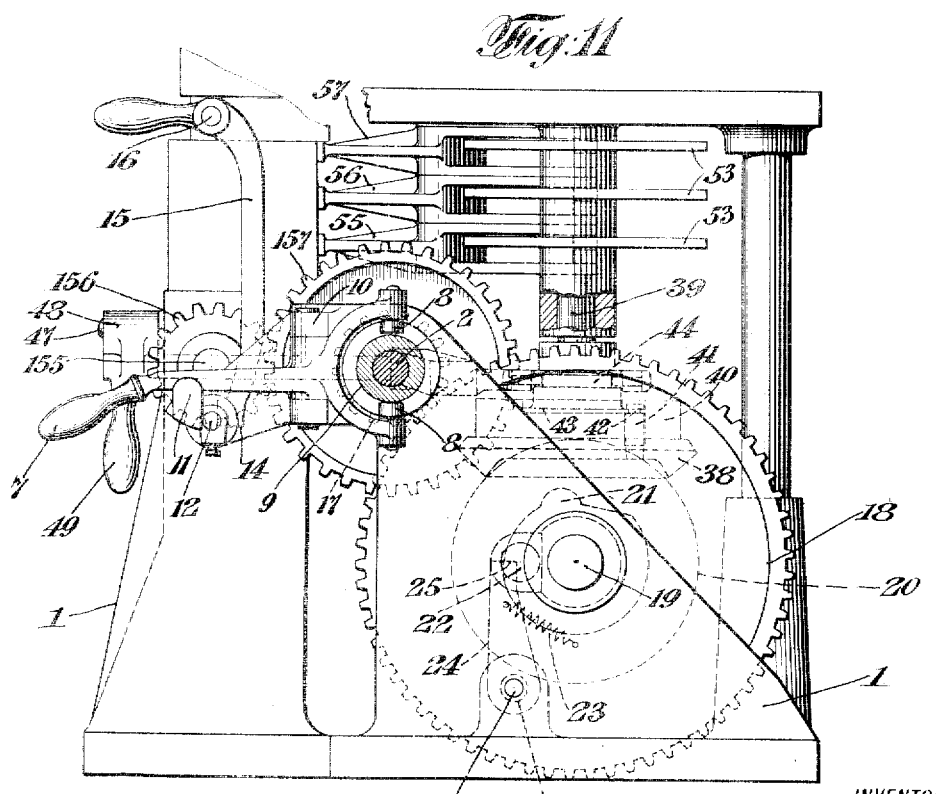

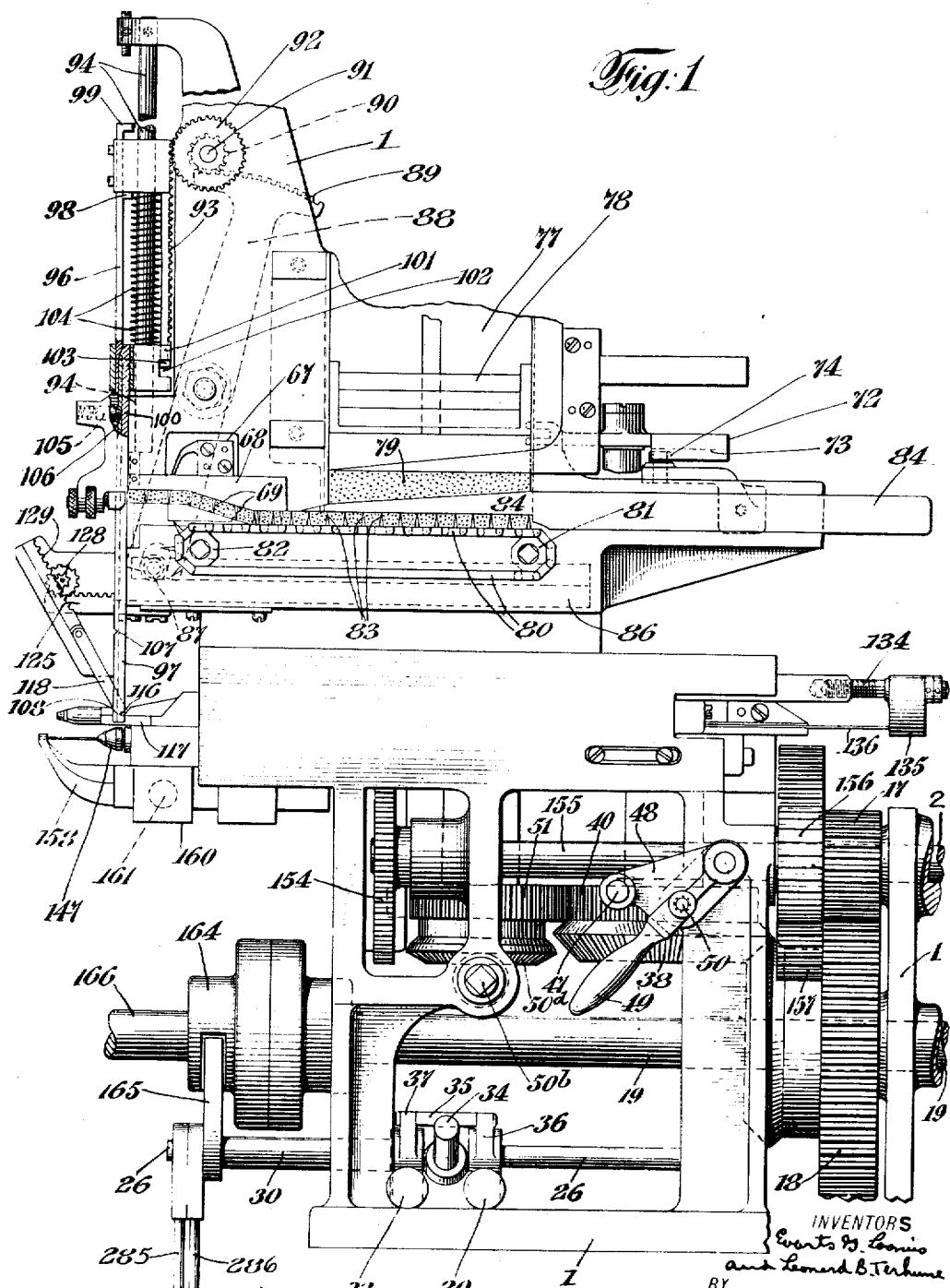

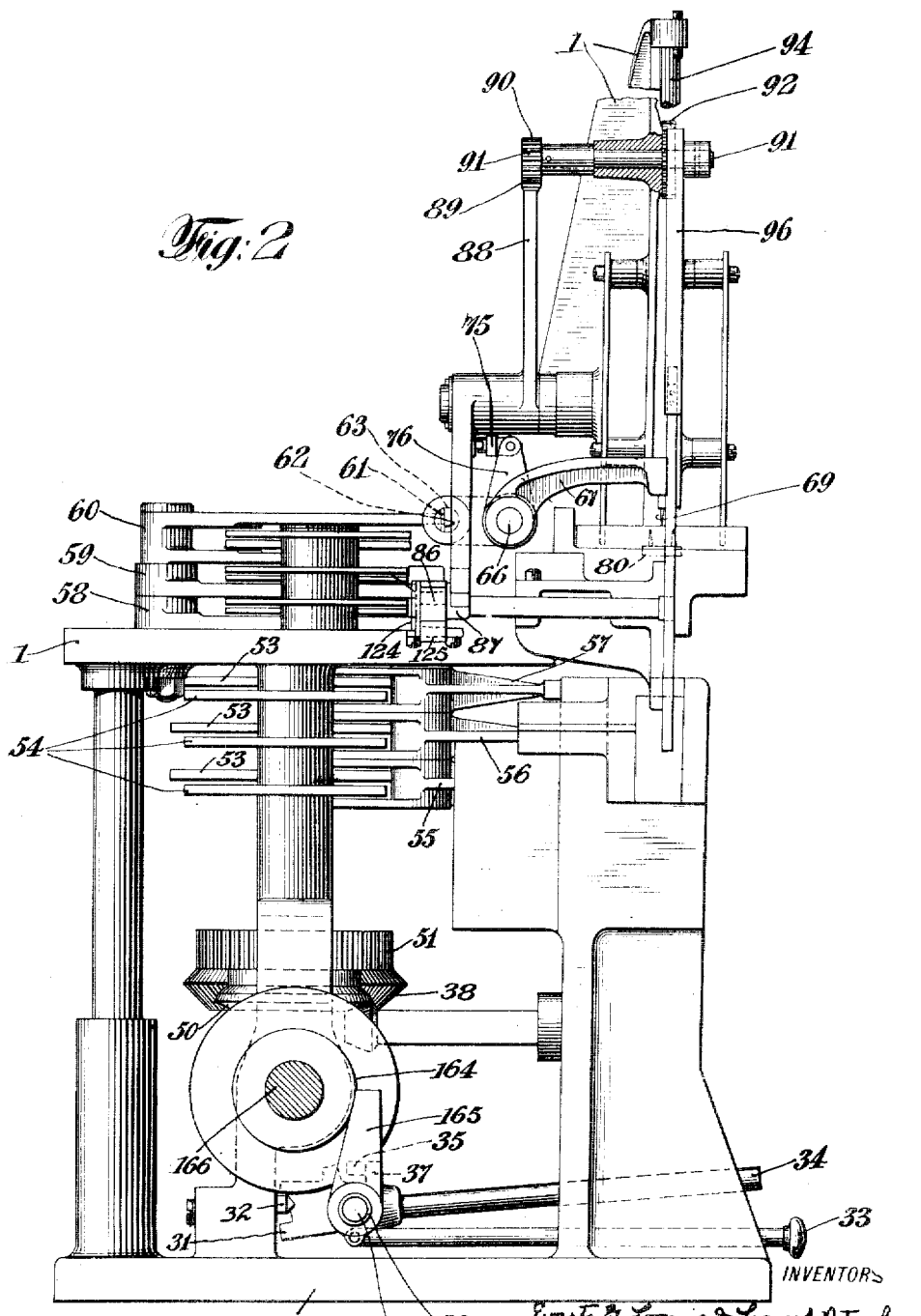

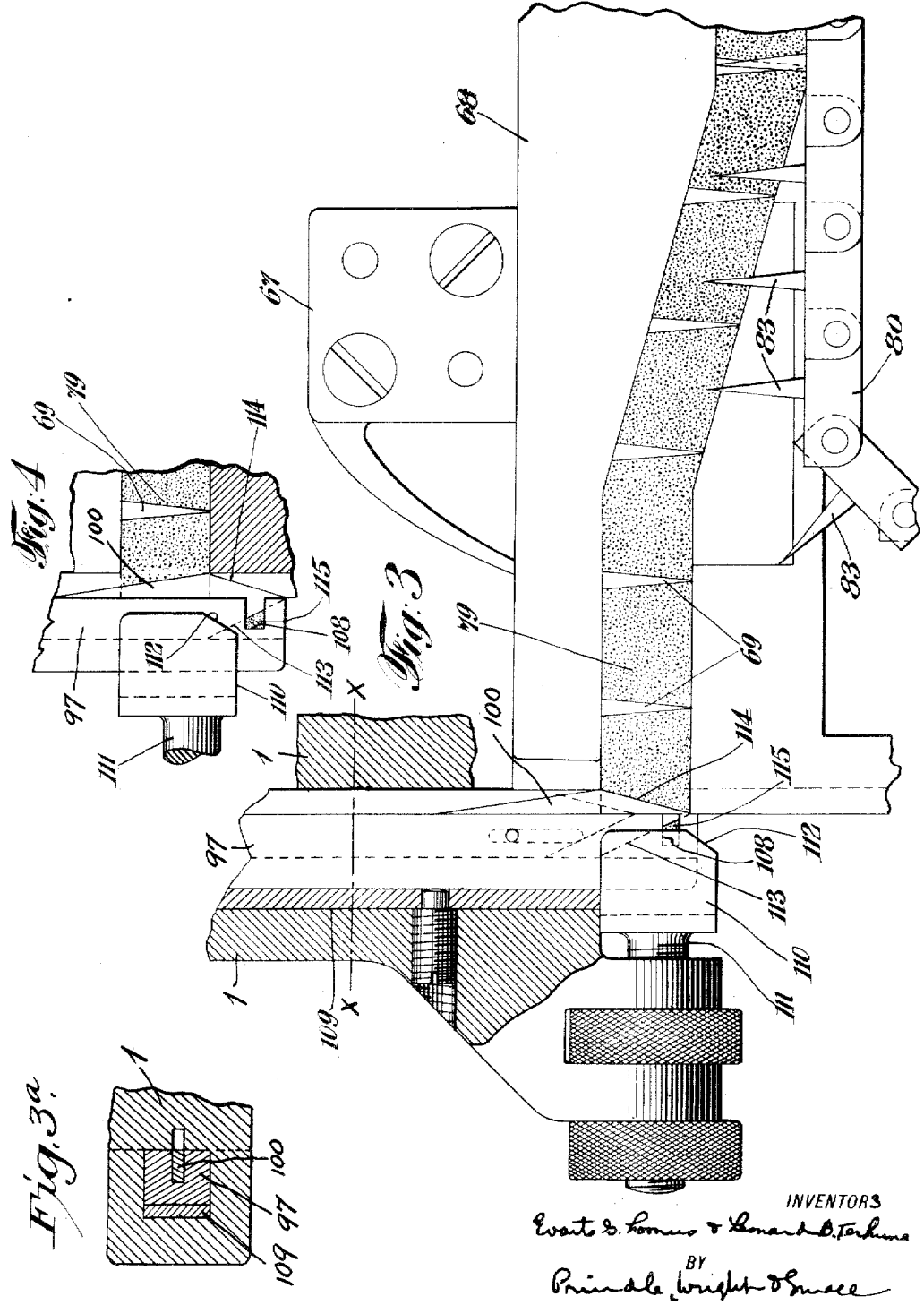

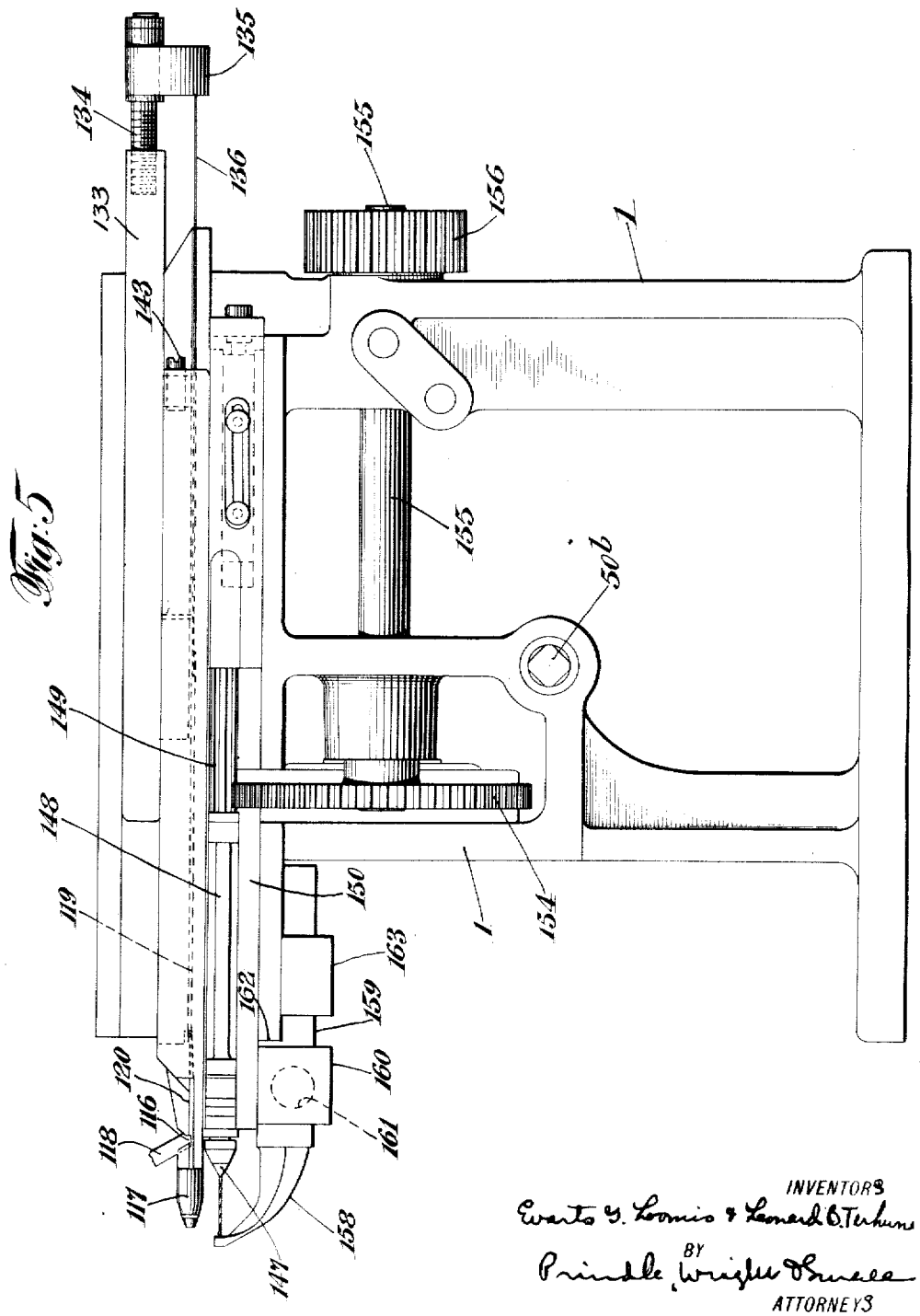

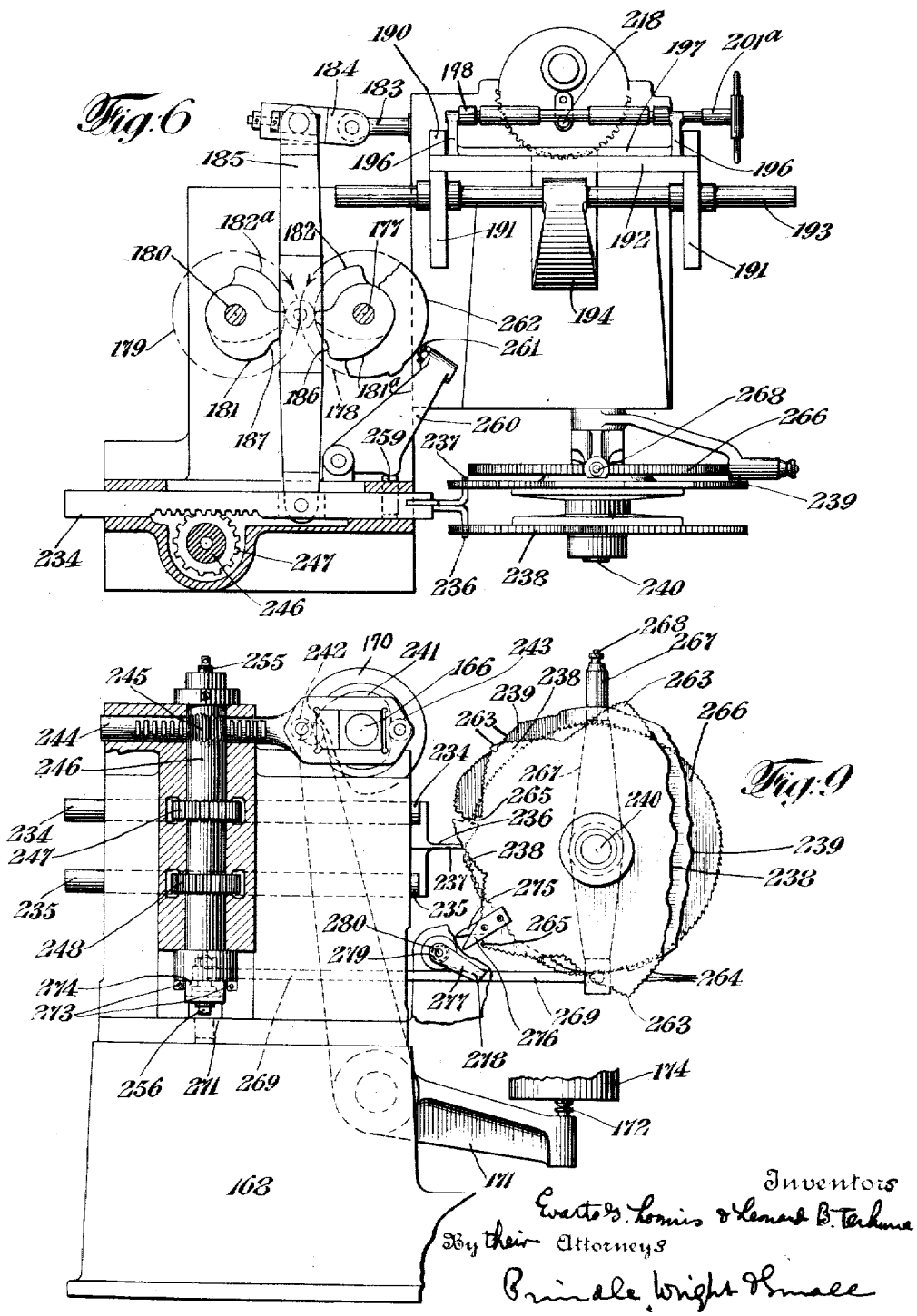

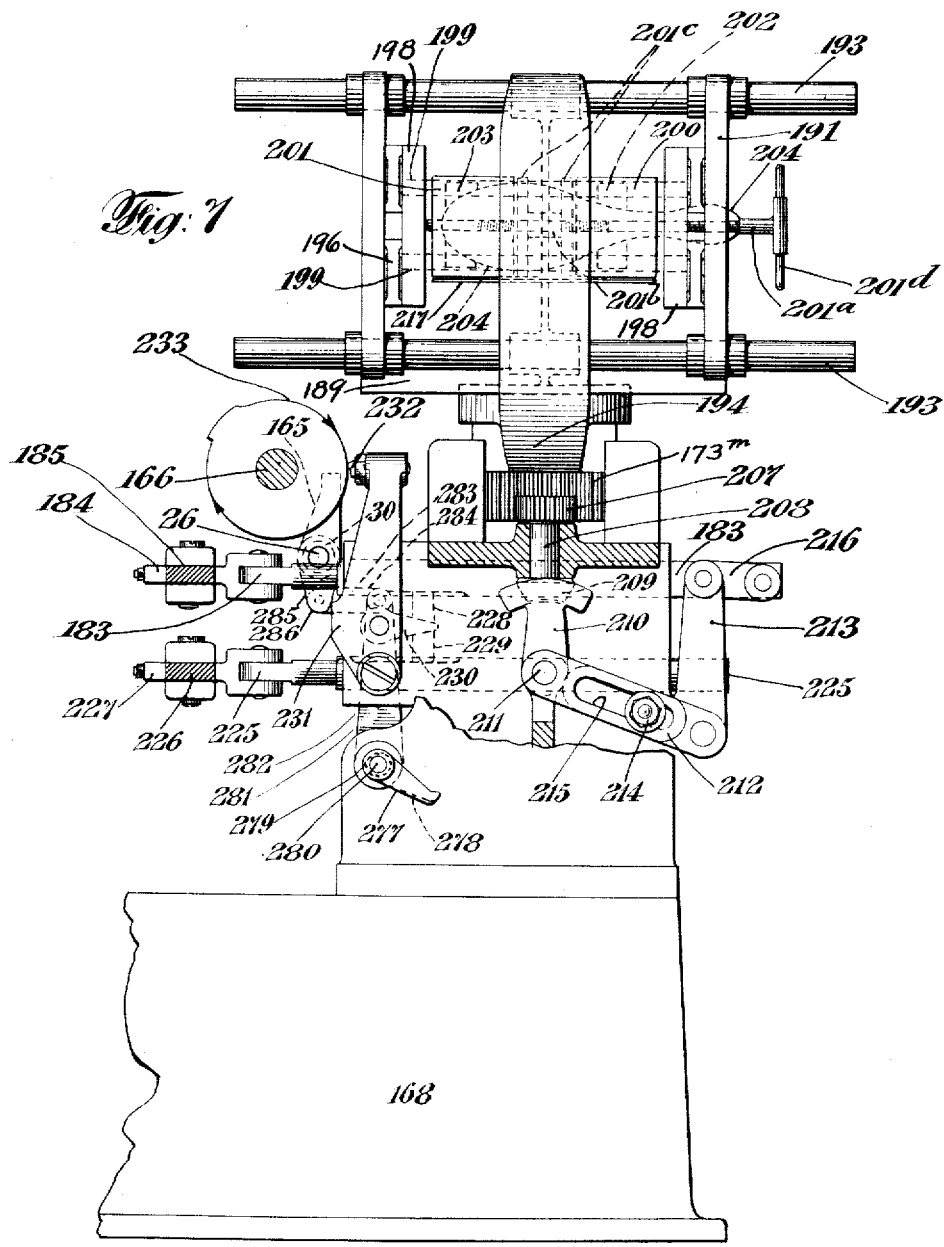

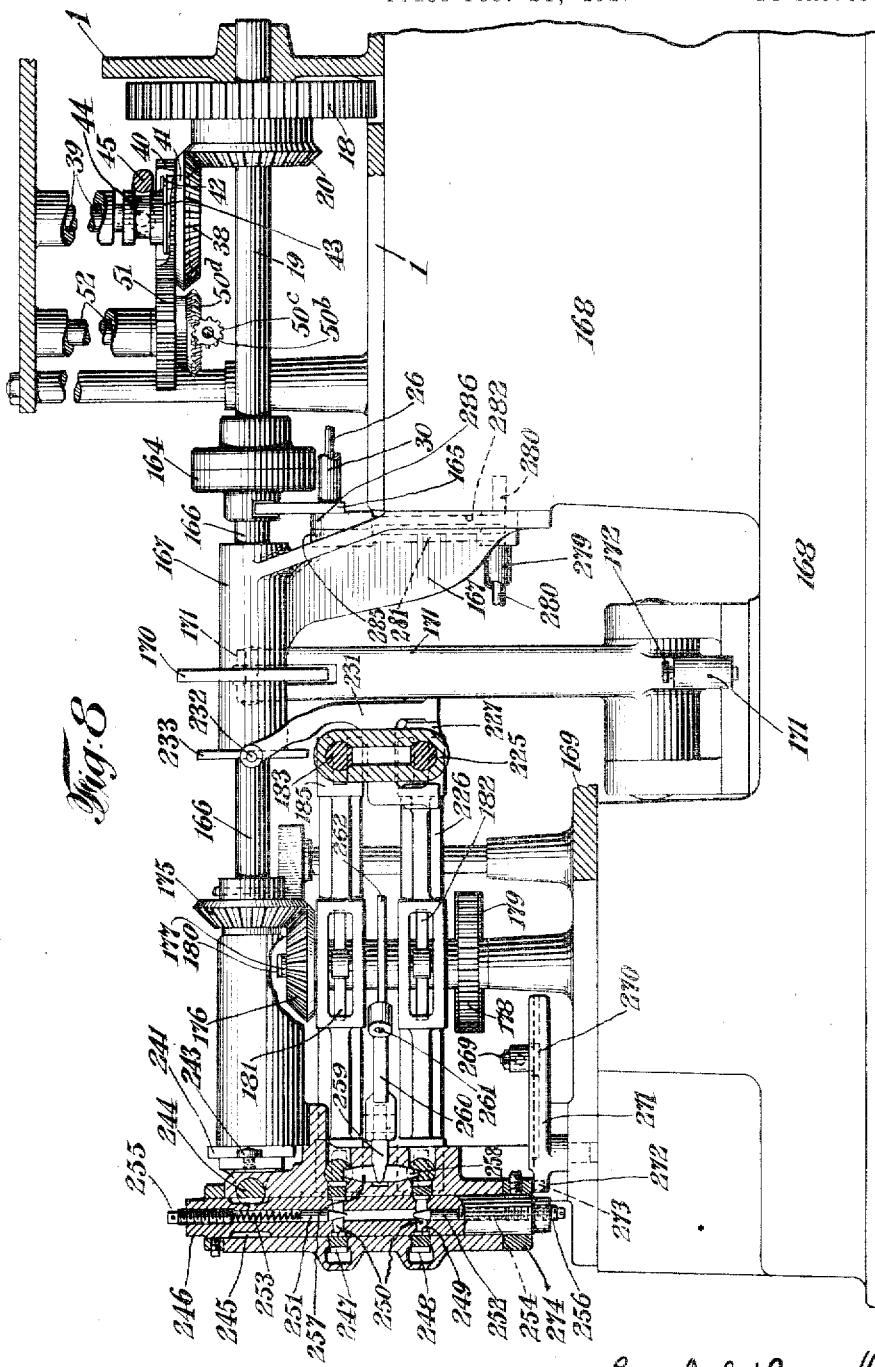

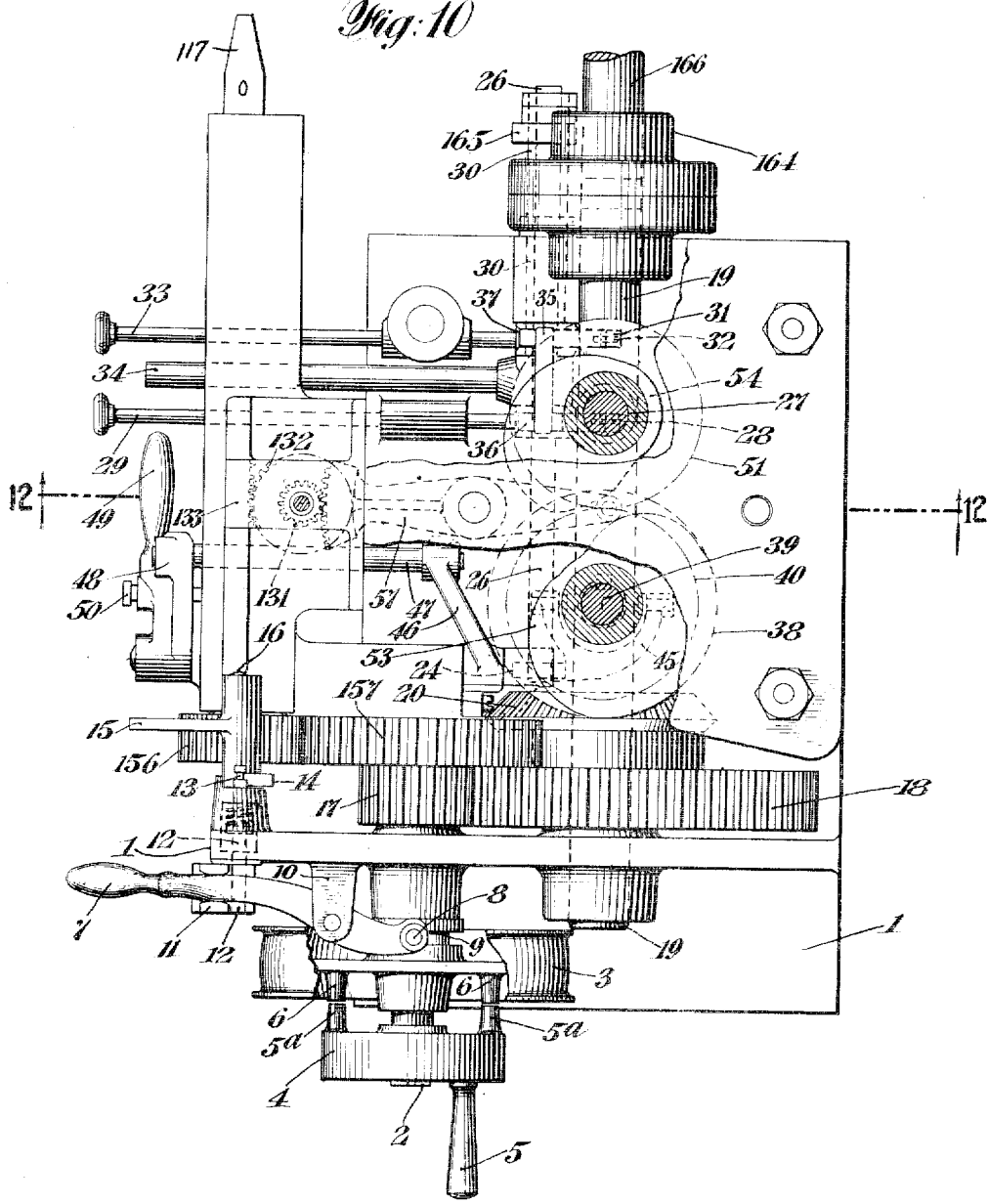

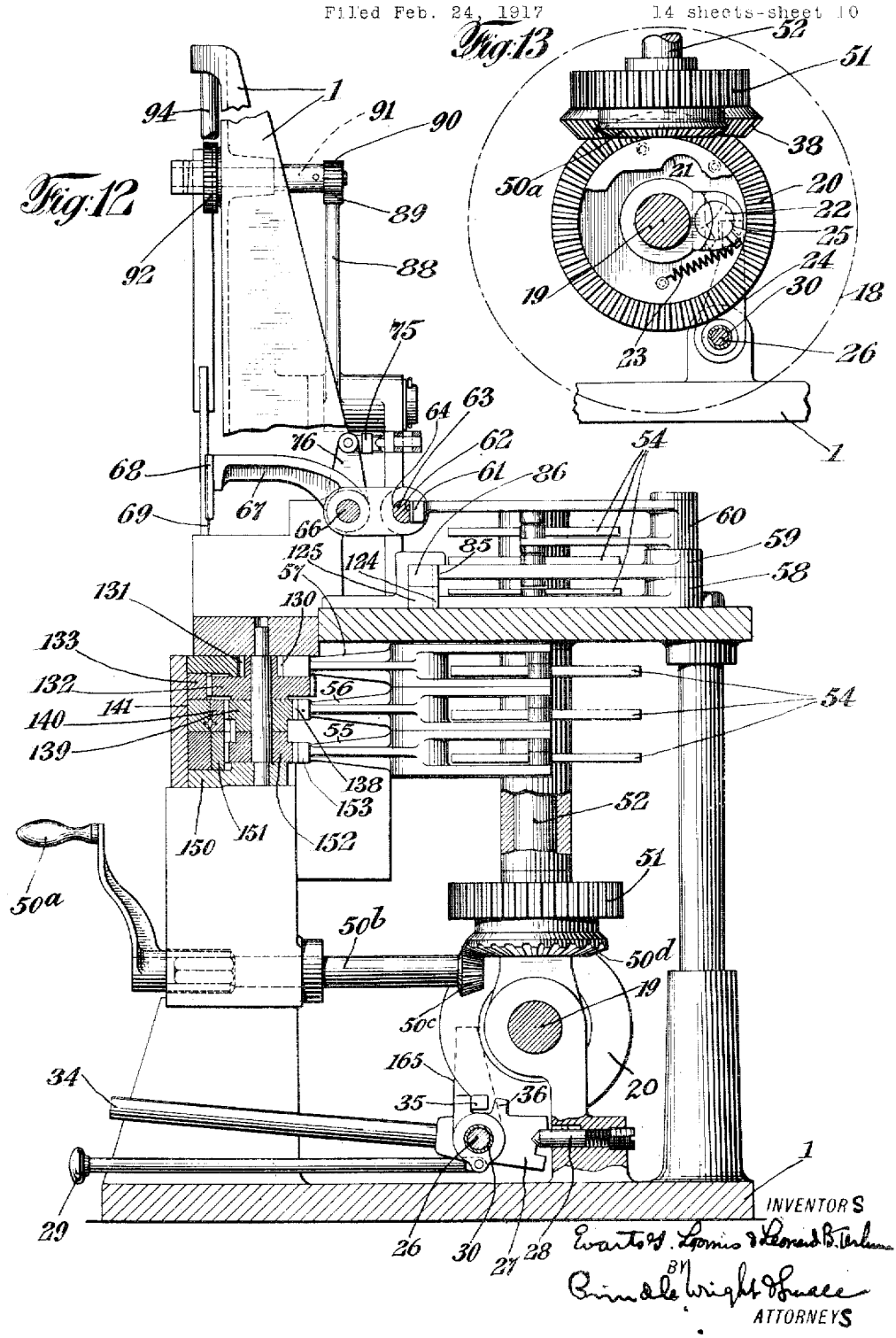

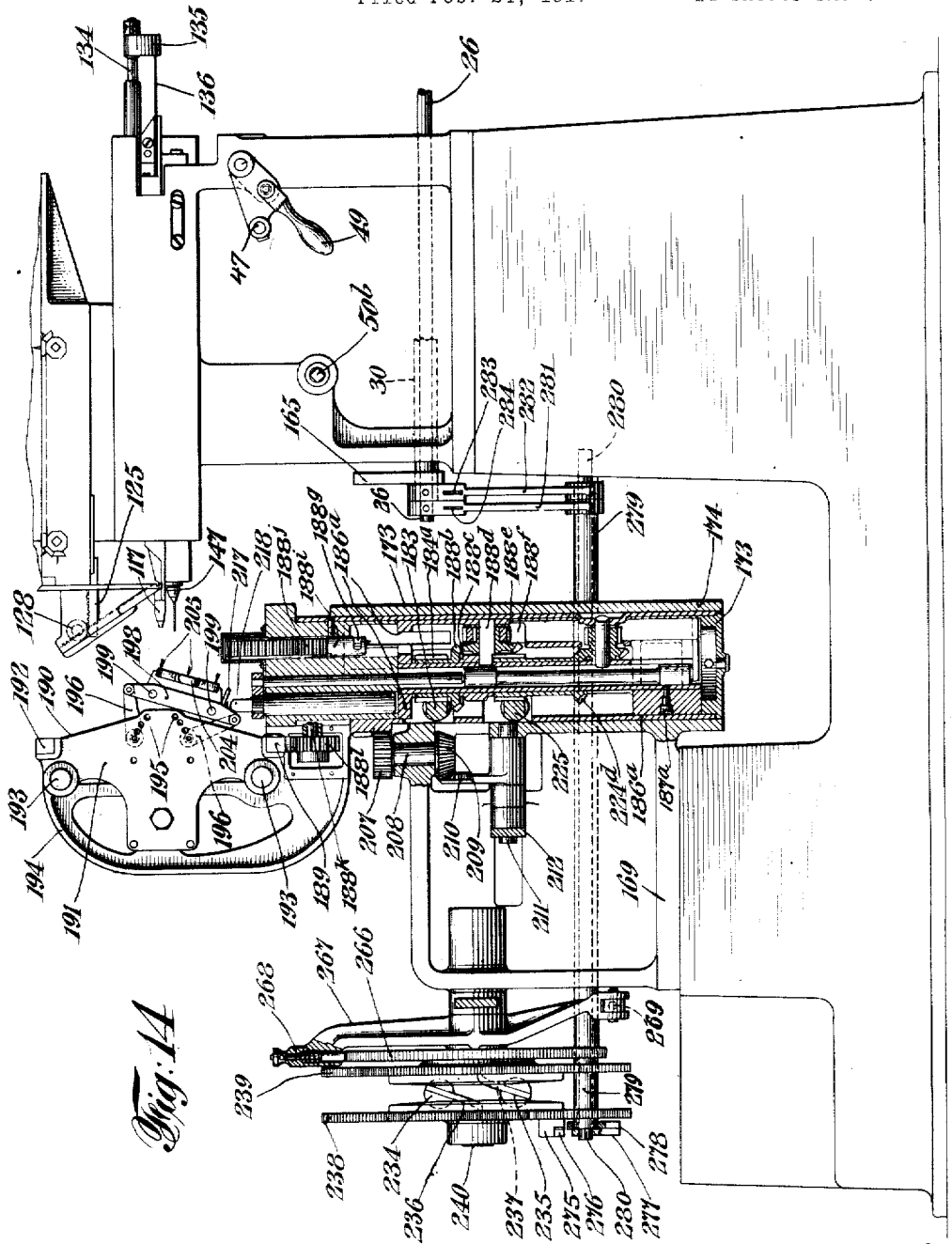

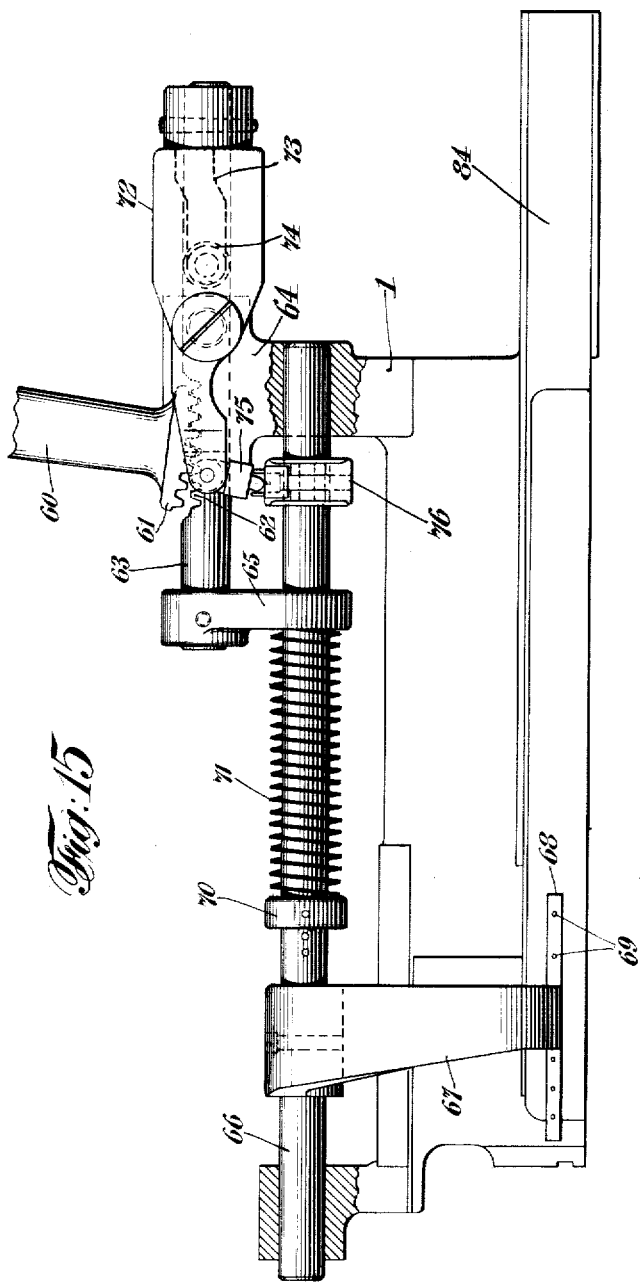

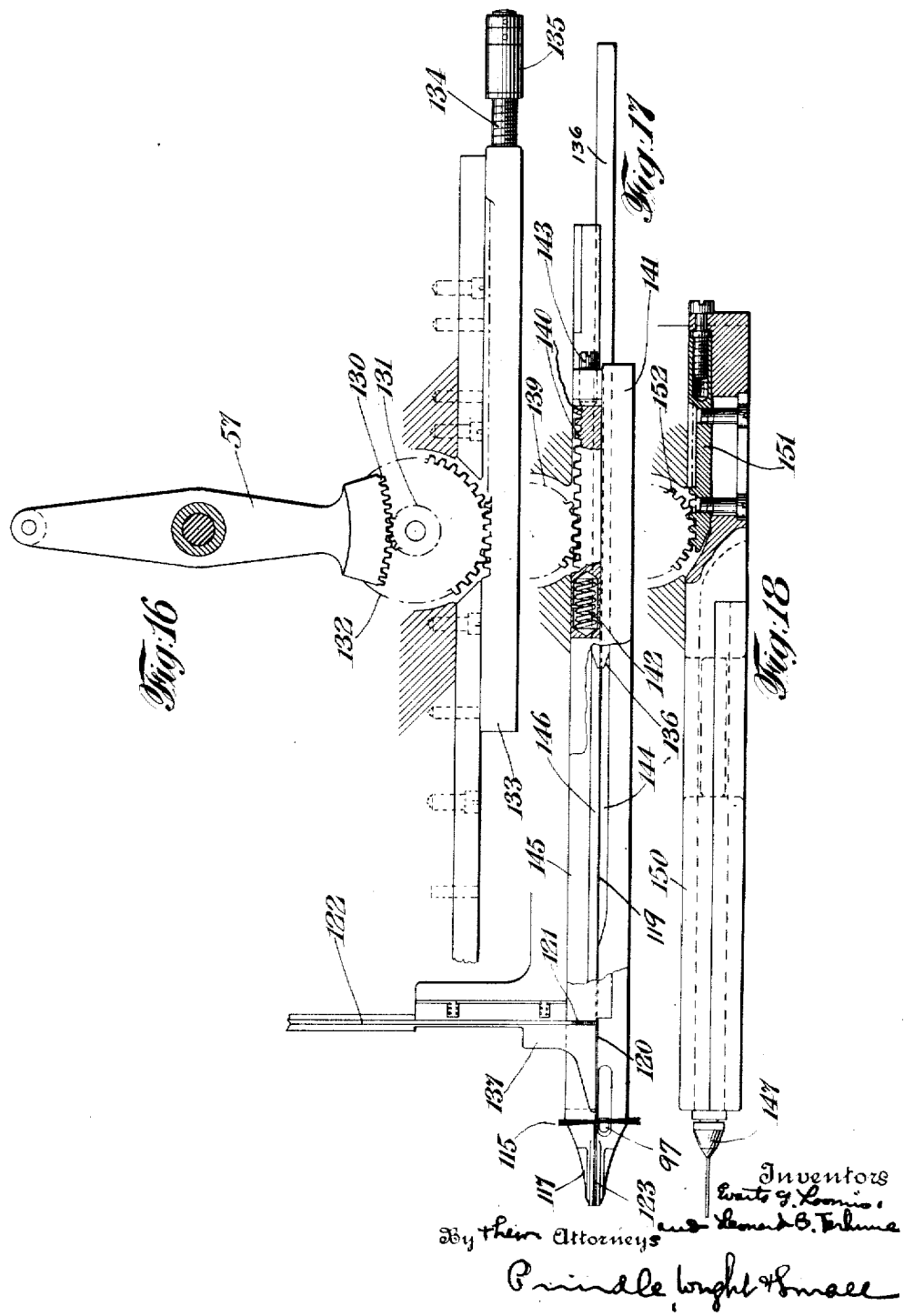

Mar. 13, 1923.
E. G. LOOMIS ET AL
MACHINE FOR MAKING BRUSHES
Filed Feb. 24, 1917
1,448,489
14 sheets-sheet 14
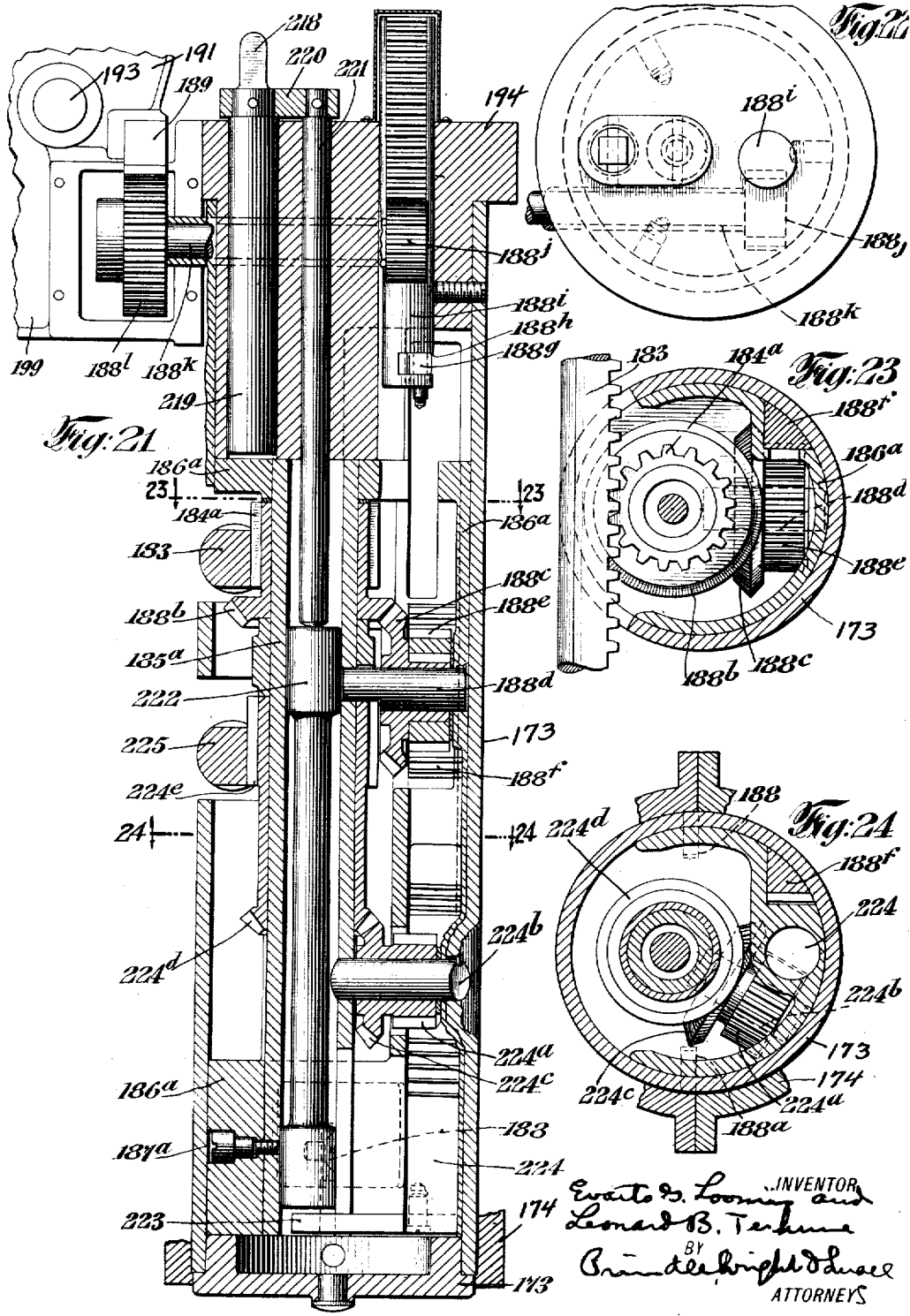

Patented Mar. 13, 1923.

1,448,489

UNITED STATES PATENT OFFICE.

EVARTS G. LOOMIS AND LEONARD B. TERHUNE, OF ARLINGTON, NEW JERSEY, ASSIGNORS, BY MESNE ASSIGNMENTS, TO E. I. DU PONT DE NEMOURS AND COMPANY, A CORPORATION OF DELAWARE.

MACHINE FOR MAKING BRUSHES.

Application filed February 24, 1917. Serial No. 150,661.

*To all whom it may concern:*

Be it known that EVARTS G. LOOMIS and LEONARD B. TERHUNE, of Arlington, in the county of Hudson and in the State of New Jersey, have invented a certain new and useful Improvement in Machines for Making Brushes, and do hereby declare that the following is a full, clear, and exact description thereof.

Our invention relates particularly to a machine adapted to make brushes of all kinds, but it is especially adapted for use in connection with the manufacture of brushes made from bristles, hair, etc.

The object of our invention is to provide a machine by means of which brushes may be made entirely automatically, that is to say, by means of which the holes in the brush are drilled and the bristles, hair, etc., inserted and fastened therein, the brush block being itself moved to the proper positions to enable the holes to be drilled for the insertion of the bristles, hair, etc. A further object is, however to arrange the machine in such a manner that the bristle-inserting mechanism and the brush block moving mechanism may be operated independently. A further object is to provide an improved form of picker mechanism by means of which the bristles, hair, etc., for each individual tuft to be inserted in the brush block are separated from the main body thereof without danger of entanglement with the main body of the bristles, hair, etc., from which the tuft has been separated, and without danger of clogging the mechanism. A further object is to provide an anchor for each tuft in an advantageous manner, that is to say, by means of a magazine, the anchors being made in a separate punching machine and fed into the magazine before the magazine is applied to the brush-making machine proper. Another object is to provide an advantageous form of locker for locking the tuft in the nozzle after the tuft has been separated from the main supply of bristles, hair, etc. A further object is to support the needle so as to prevent bending when it is advancing for the insertion of the tuft in the brush block.

Another object is to arrange the tuft-inserting nozzle and the drill in such manner that they may be firmly supported, and in such manner that it is not necessary for them to be shifted laterally in the drilling and tuft-inserting operations. A further object is to provide an efficient form of cam mechanism for operating the drill, needle, nozzle, etc. Another object is to provide an advantageous mechanism by means of which a brush block may be shifted to different positions for the drilling and tuft-inserting operations and to the different positions necessary for the insertion of the tufts in the various portions of the brush block. A further object is to shift the brush block in this manner, while, at the same time, providing it with the necessary angle to make the desired inclination to the bristles, hair, etc., in the different portions of the brush block. A further object is to provide patterns controlling the positions of the brush block so arranged as to not support the strain of the brush block shifting mechanism. Further objects of our invention will appear from the detailed description thereof hereinafter.

While our invention is capable of embodiment in many different forms, for the purpose of illustration we have shown only one form thereof in the accompanying drawings, in which, Figure 1 is a front elevation of a machine made in accordance with the invention, showing the assembled drilling, bristle picking and filling mechanisms.

Fig. 2 is a left hand side elevation of the tufting mechanism;

Figs. 3 and 4 are vertical sections enlarged showing a portion of the picker in two different positions;

Fig. 3ª is a fragmentary sectional view taken on line *x—x* of Figure 3;

Fig. 5 is a front elevation of the drill, nozzle, needle, and operating parts for the same, shown more in detail.

Fig. 6 is a plan view of the brush block shifting mechanism;

Fig. 7 is a left hand sectional side elevation of the same;

Fig. 8 is a vertical section of the same taken parallel to the view in Figure 1;

Fig. 9 is a left hand elevation of the brush block shifting mechanism;

Fig. 10 is a plan view of the lower portion of the tuft mechanism with the bristle box etc. removed, showing the driving mechanism.

Fig. 11 is a right hand side elevation of the driving mechanism with parts removed;

Fig. 12 is a vertical section taken on line 12—12 of Fig. 10;

Fig. 13 is a left hand side elevation of a detail of one of the clutches;

Fig. 14 is a side elevation partly in section showing more particularly the brush block holding mechanism;

Fig. 15 is a plan view enlarged of a portion of the bristle feeding mechanism;

Fig. 16 is a plan view partly in section, showing the devices for moving the needle;

Fig. 17 is a similar view of the devices for moving the nozzle;

Fig. 18 is a similar view of the devices for moving the drill;

Fig. 19 is a vertical section showing the devices for moving the nozzle; and driving the drill;

Fig. 20 is a vertical section showing the needle-supporting blade;

Fig. 21 is a vertical section of the brush block supporting plunger and associated parts;

Fig. 22 is a top view of such plunger;

Figs. 23 and 24 are sectional views, taken, respectively, on lines 23—23 and 24—24 of Fig. 21.

In the drawings we have shown a main frame 1 of a tuft mechanism having therein a main driving shaft 2 (Fig. 10), which carries loosely thereon a pulley 3 adapted to be driven from any suitable source of power. On the shaft there is a hand wheel 4 provided with a handle 5 which may be used to operate the whole machine when desired by hand. This wheel 4 has projections 5ª, which are adapted to co-operate with two similar projections 6 on the pulley 3, so that when the pulley 3 is shifted towards the wheel 4, said pulley becomes engaged with the shaft 2, so as to drive the same. The pulley 3 is shifted by means of a hand lever 7 having pins 8, which co-operate with a groove 9 located in the hub of the pulley. The lever 7 is pivoted in a bracket 10 located on the main frame 1. The outer end of the lever 7 is carried in a fork 11, located on a spring-pressed rod 12, which passes through the main frame 1 and has an annular recess 13 adapted to be engaged by a catch 14 on a hand operated tripping lever 15, carried by a pivot 16 on the main frame 1. The shaft 2 carries a gear 17, which meshes with a gear 18 on a shaft 19 and said shaft 19 loosely carries a bevel gear 20.

In the interior of the gear 20 there is a tufting mechanism clutch comprising a recess 21 (Fig. 13) adapted to be engaged by a rotary pin 22, which is cut out at one side thereof, so that in one position it engages the recess 21 and in another position it is disengaged therefrom. The pin 22 which is carried by the bevel gear 20 is normally moved so as to be in engagement with the recess 21 by a spring 23 also attached to the bevel gear 20. In order to release the pin 22 from the recess 21, a lever arm 24 may be moved so as to engage with a right angular recess 25 in the pin 22, thereby shifting the pin 22 so as to no longer permit its engagement with the recess 21. The lever 24 is on a shaft 26 (Fig. 12) which is provided with an arm 27 adapted to act as a catch by co-operating with a spring-pressed plunger 28 located in the main frame 1 of the machine. This arm 27 is pivoted to a hand operated rod 29 which is used for operating the clutch just described. Around the shaft 26 there is a hollow shaft 30 carried by the main frame 1, provided with an arm 31 (Fig. 2), the same in shape as the arm 27 and which is adapted to co-operate with a spring pressed catch 32, the same in construction as the catch 28. This arm 31 is in a similar manner pivoted to a hand operated rod 33 for operating a clutch controlling the brush block shifting mechanism to be hereinafter described. When it is desired to operate both this clutch and the clutch previously described for controlling the tuft mechanism a single lever 34 may be operated to move both clutches simultaneously. This lever 34 which is carried in the main frame 1 of the tuft machine is loosely supported upon the shaft 26 and has two wings 35 located between ears 36 and 37 (Fig. 1) on the arms 27 and 31 respectively, so that by the movement of the rod 34 both of the arms 27 and 31 may be moved simultaneously thereby moving both of said clutches simultaneously.

The bevel gear 20 is arranged to mesh with a bevel gear 38 (Fig. 8) loosely carried by a vertical shaft 39. Fast upon said shaft 39 and adjacent to the gear 38 there is a spur gear 40. In the gear 40 there is a movable pin 41 engageable with gear 38, and having an annular recess 42, which engages with a flange 43 on a clutch member 44 which is loose on the shaft 39 and arranged to be moved by a yoke 45 (Fig. 10), pivoted on the main frame 1 and having an arm 46 connected by a swinging rod 47 to a lever 48, (Fig. 1), having a handle 49 and arranged to be locked to the main frame 1 in its upper position by a spring pressed pin 50, cooperating with the frame 1. The clutch which is controlled by the handle 49 is arranged so as to disconnect the tufting mechanism entirely from the remainder of the machine, so that the operator may, if desired, apply a handle 50ᵃ (Fig. 12) to a shaft 50ᵇ having a bevel gear 50ᶜ meshing with a gear 50ᵈ on a shaft 52 and thereby drive forwardly or rearwardly, as desired the tufting mechanism. The gear 40 meshes with a gear 51 on the shaft 52 which is parallel to the shaft 39. Said shafts 39 and 52 are arranged to operate the tufting mechanism.

On the shaft 39 there is a series of six cams 53 (Fig. 2) and on the shaft 52 there is a series of six cams 54 for moving a series of six levers 55, 56, 57, 58, 59 and 60, for operating respectively the drill, nozzle, needle, locker, picker and bristle fork.

The lever 60, which is arranged to move the bristle fork has a gear segment 61 (Fig. 15) on its end to cooperate with a rack 62 on a plunger 63, which moves in a bearing 64 on the main frame 1. This plunger 63 has an arm 65 which is arranged to slide on a bristle fork supporting-rod 66, also supported in the main frame; said rod having an arm 67 provided with a transverse bar 68 carrying a plurality of depending teeth 69 to operate as a bristle fork. On the rod 66 there is an adjustable collar 70 between which and the arm 65 there is a spring 71 interposed. By the movement of the arm 65 the bristle fork is given a horizontal reciprocatory motion. At the ends of the reciprocatory movements of the bristle fork 67 it is given a vertical movement by the rotation of the rod 66. This is brought about by means of a lever 72, pivoted on the frame 1 and having a cam slot 73, in which a roller 74 on the plunger 63 moves. The end of the lever 72 is connected by a link 75 with a lever arm 76 secured to the rod 66. In detail, the movement of the bristle fork 68 is as follows: Fig. 15 shows the bristle fork in advanced position and in its lowermost position engaging the bristles. As lever 60 moves backward to collar 65, spring 71, which has only been put under slight compression by the advancing movement of collar 65, is released from engagement therewith, and collar 65 moves back freely without disturbing bristle fork 68 until roller 74 engages the incline in cam slot 73. This happens before collar 65 engages arm 76; the rocking of lever 72 by the incline consequently moves arm 76 to lift bristle fork 68 out of engagement with the bristles. Upon further backward movement of collar 65 it comes into engagement with lever 76, thus moving bristle fork 68 backward a slight distance, the bristle fork being maintained in raised position.

When the advancing movement of rod 63 begins again, collar 65 moves forward without affecting the position of the bristle fork until the incline of cam slot 73 is reached by roller 74. This happens before collar 65 reaches spring 71 and consequently arm 75 rocks shaft 62 to move downwardly the bristle fork 68 while the latter is still in rearmost position. Further forward movement of collar 65 brings the same into engagement with spring 71 and the slight forward movement of bristle fork 68 in lowered position takes place during the remainder of the stroke of collar 65, after which the bristle fork is elevated, retracted, lowered and advanced as previously described. The bristles which are conveyed forward by this motion of the bristle fork 68 are supplied from a container 77 (Fig. 1) having a weighted plunger 78 for forcing a body of bristles 79 downwardly therein. The bristles thus conveyed are received by an endless chain 80 carried upon two idler sprockets 81 and 82 on the main frame; said chain 80 having a number of teeth 83 which extend upwardly towards the body of bristles 79. The pockets formed between the teeth 83 are arranged to be evenly filled from the body of bristles 79 by means of a bristle knife 84, which is reciprocated at intervals by hand, using its outer end as a handle. In the reciprocatory movement of the fork 68, which moves in a substantially rectangular path the pockets full of bristles on the chain 83 are fed forwardly to the picker to be now described.

The picker lever 59 (Fig. 12) has a gear segment 85 which co-operates with a sliding rack 86, having a roller 87 (Fig. 2) thereon to move a lever 88, pivoted on the main frame and having in turn a gear segment 89 (Figs. 1 and 2), which co-operates with a gear 90 on a shaft 91, carrying a gear 92, meshing with a vertically movable rack 93. The rack 93 is arranged to slide on a vertical rod 94 supported in the main frame 1. The upper end of the rack 93 carries the upper end of a bar 96 to which is attached a picker casing 97, said bar 96 having ears 98 and 99, so located as to give a certain amount of free movement between the picker casing 97 and the rack 93, in order to permit relative movement between a picker knife 100 and the picker casing 97 in which it is located, at the upper and lower ends of its path of movement. The picker knife 100 is secured to a sliding sleeve 101 on the rod 94, which has recesses 102 at either side thereof to receive ears 103 attached to the rack 93. Between the upper end of the rack 93 and the sleeve 101 there is a spring 104 which tends to keep the sleeve 101 downwardly at all times and therefore to exert pressure by the lower end of the knife upon the body of bristles engaged by the same. The free play in the recesses 102 permits this to be accomplished. In the main frame there is a spring pressed plunger 105 which engages with recesses 106 and 107 in the picker casing 97 so as to retain the picker casing 97 at the lowest limit of movement and at the highest limit of movement permitted by the ears 98 and 99 in the reciprocation of the rack 93. By this means the picker knife 100 is started on its upward path before the picker casing 97 begins to move upwardly, and furthermore, the knife 100 starts to move downwardly before the picker casing 97 starts its downward movement so as to permit the tuft of bristles to be removed and inserted in recesses 108 (Fig. 3) provided for this purpose at the lower end of the picker casing 97. At the side of the picker casing 97 there is a gib 109 to exert sufficient pressure to take up the wear upon the same. Opposite to the point from which the bristles are fed into the picker casing 97, there is a bifurcated guide 110 supported upon an adjustable screw 111, said guide being provided with beveled surfaces 112 at the lower corners thereof. It will also be noted that the lower end of the picker knife 100 is provided with two inclined surfaces 113 and 114. The operation of this portion of the mechanism is such that the knife 100 is descending while the picker casing 97 is at rest opposite to the supply of bristles, and with the slots 108 located above the level of the bottom of the supply of bristles, so that a tuft of bristles 115 is forced into the recesses 108 by the inclined surface 113 before the picker casing 97 reaches the bottom of the main body of bristles, and the main body of bristles is forced inwardly away from the bristles by the inclined surface 114 before the casing 108 reach the bottom of the body of bristles. Furthermore before the recesses 108 reach the bottom of the body of bristles, said recesses will come opposite to the inclined faces 112 upon the guide 110, thereby permitting the tuft of bristles 115 to be forced back into the ends of the recesses 108 (see Figs. 3 and 4). The picker casing 97 and the knife 100 now descend together until they reach a recess 116 in a nozzle 117. Before the knife 100 is retracted, the locker 118 descends into the recess 116 so as to hold the bristles in place. The knife 100 now ascends and a needle 119 (Fig. 17) moves forwardly in a recess 120 in the nozzle 117 withdrawing an anchor 121 from a magazine 122 located in a horizontal position at the rear of the machine, carries the anchor outwardly and withdraws the bristles from the recess 116 by folding them in the center and forcing them into a slot 123 at the opposite end of the nozzle 117. The picker casing 97 is now moved upwardly and is ready for another operation.

The locker 118 is operated by the lever 58 which has a gear segment 124 (Fig. 2, Fig. 12) co-operating with a sliding rack 125 which rotates a pinion 128 (Fig. 1) co-operating with a rack 129 which is pivoted to the locker 118.

The needle 119 is moved by the lever 57 (Figs. 12 and 16) which is provided with a gear segment 130, meshing with a gear 131, connected to a large gear 132 co-operating with a sliding rack 133, carrying in its end an adjustable screw 134 (see Fig. 5 also) on which there is located an arm 135 to which there is attached a needle blade 136. The needle 119 is attached to the end of the needle blade 136 said parts being flattened in planes at right angles to each other. At the front of the nozzle 117 there is a needle-supporting guide 137 rigid on main frame 1 (Fig. 17) which engages in the rear slotted portion of the nozzle 117 and thus prevents the needle from bending when the nozzle is in its forward position.

The nozzle 117 is moved by the lever 56 (Fig. 12) which carries a segment of a gear 138 to co-operate with a pinion 139. This pinion 139 meshes with a rack 140 (Fig. 17) which rests in a recess in a nozzle bar 141 attached to nozzle 117. At the inner end of the rack 140 there is a spring 142 interposed between the same and the nozzle bar 141 and at the rear of the rack 140 there is an adjusting screw 143. In the nozzle bar 141 there is a slot 144 to receive one side of the needle blade 136, while a stationary bar 145 fast on the frame 1 and located at one side of the stationary supply of anchors 122 contains a slot 146 to receive the other side of the needle blade 136.

The lever 55 is arranged to shift a drill 147. The drill 147 (Fig. 5) is carried upon a shaft 148 provided with a gear 149, in a sliding carriage 150 carrying an adjustable rack 151 (Fig. 12), which meshes with a gear 152 in mesh with a gear segment 153 on the lever 55. The drill 147 is rotated by means of a gear 154 meshing with the gear 149, said gear 154 being located on a shaft 155 carrying on its end a gear 156. The gear 156 receives its power from the gear 157 (Fig. 1) on the shaft 2. At the front of the drill 147 there is a drill guide 158 carried by a plunger 159 in a sleeve 160 on the sliding carriage 150, which has a friction washer 161 to allow a limited amount of slip between the plunger 159 and the drill 147, so as to set the guide 158 against the brush block while the drill advances through the guide into the brush block in the drilling operation. The guide 158 is reset in its rearward movement by the plunger 159 coming into contact with a stop 162 attached to a stationary bearing 163 on the main frame 1.

The brush block shifting mechanism is operated from the shaft 19 (Fig. 1), which extends beneath the tufting mechanism and has on its left hand end a clutch 164, which is the same in construction as the clutch located at the right hand end for driving the tufting mechanism. For this clutch there is an operating lever 165, located on the hollow shaft 30. This clutch 164 is arranged to connect the shaft 19 with a shaft 166 (Fig. 8) journaled at one end in a bracket 167 on a foundation plate 168, which not only extends beneath and supports the main frame 1 of the tuft mechanism but also supports in a similar manner a main frame 169 of the brush block shifting mechanism. On the shaft 166 there is a cam 170 (Fig. 9) which operates a bell crank lever 171 on the plate 168, having an adjustable pin 172 for shifting in a vertical direction the entire brush holding apparatus which is supported by a head, shown in the form of a hollow plunger 173 (Fig. 14) carried by a hollow casing 174 on the main frame 169. The upward movement produced by the bell crank lever 171 is sufficient to raise the brush holder a slight distance above the particular position in which the tuft is to be inserted and then the holder is lowered to the position at which the tuft is to be inserted, so as to prevent the bristles that have already been inserted from being damaged by the bristle inserting nozzle. The shaft 166 has intermediate its ends a bevel gear 175 (Fig. 8) meshing with a bevel gear 176 on a vertical shaft 177. The last mentioned shaft has a gear 178 (Fig. 6) meshing with a gear 179 on a shaft 180 parallel to the shaft 177. On shafts 177 and 180 there are two upper cams 181 and 181$^a$ and two lower cams 182 and 182$^a$, the upper cams being provided to produce the cross-wise shifting of the brush block and the lower cams being provided for producing the vertical shifting of the brush block. The upper cams 181 and 181$^a$ determine the position of a rack 183 which has an adjustable link 184 connecting the rack 183 to a lever 185 which is operated by means of the cams 181 and 181$^a$. It will be noted that the cam 181$^a$ is somewhat different in shape from the cam 181 as the cam 181$^a$ has at its higher portion an elevation 186 where the other cam 181 has a corresponding depression 187. The purpose of the elevation 186 and the depression 187 is to invariably cause the brush block to be positioned by a movement from the same direction, notwithstanding the fact that the brush block in moving from the position of one tuft to that of another is moved in a zig zag direction from one row of tufts to another and from the top of the brush block downward until all the rows of tufts have been completed. In other words in any mechanism in which there are relatively movable parts there is a certain amount of play that is unavoidable and therefore in the positioning of the brush block it is desirable to feed the block always in the same direction, so as to prevent the play from occurring first at one side and then another of the positions of the various tufts. At the same time it is desirable also, however, as in the present mechanism to shift the brush block in one direction to produce a given row of tufts and then to shift it in the opposite direction to produce the next row of tufts. By arranging the cams in the manner above described, the brush block is invariably fed up to the position of a particular tuft from the same direction, notwithstanding the fact that the brush block is shifted along one row of tufts in one direction and the next row of tufts in the opposite direction. The effect of the cams 181 and 181$^a$ is to move the brush block steadily forward along one row of tufts and to move the brush block along the next row of tufts in such a manner as to bring the brush block a slight distance beyond the position of the particular tuft and return it before said particular tuft is inserted. The rack 183 (Fig. 21) meshes with a gear 184$^a$ on a bushing 185$^a$, which is carried at its lower end on a casting 186$^a$ to which it is secured by a screw 187$^a$, and which is keyed to the main frame 174 by means of two keys 188, 188$^a$ (Fig. 24). The casting 186$^a$ is supported within the hollow plunger 173. Beneath the gear 184$^a$ there is furthermore provided a bevel gear 188$^b$ which meshes with a bevel gear 188$^c$ on a shaft 188$^d$, one end of which is supported in the bushing 185$^a$, and the other end in the casting 186$^a$. Secured to the gear 188$^c$ there is a gear 188$^e$ which meshes with a triangular rack 188$^f$ and which is provided with an arm 188$^g$ arranged to be received in a slot 188$^h$ in a cylindrical rack 188$^i$ which in turn meshes with a gear 188$^j$ on a shaft 188$^k$ which carries a gear 188$^l$ meshing with a rack 189 on a carriage 190 (Fig. 14) which is comprised of end plates 191 (Fig. 6) connected by rods 192. These end plates 191 are arranged to slide upon rods 193 carried by a bracket 194 forming a part of the hollow plunger 173. In each of the plates 191 there are two series of holes 195 which are in effect located in two curved lines approaching each other at the side of the machine adjacent to the tuft mechanism. The holes 195 are designed to receive the inner ends of links 196, of which there may be a number of different sizes, one for each pair of the holes 195, so that by this means the degree of inclination of the tufts in different brushes may be varied. The upper links 196 are rigidly connected together by a hub 197 (Fig. 6) and the lower links 196 are similarly connected together. The outer ends of the links 196 are connected to a supporting frame 198 (Fig. 7) having a plurality of cross rods 199 carrying two clamping plates 200 and 201 having removable and adjustable clamping jaws 202 and 203 for clamping in place a brush block 204 into which tufts 205 are to be inserted. As is most clearly shown in Fig. 14, the head 173, carriage 190 and brush block support 198 locate the work point on the brush block substantially in line with the axis of rotation of head 173, and at the point of intersection of such axis with the longitudinal axis of the drill or tufter, as the case may be.

If the head 173 be turned angularly to change the inclination of the tufts at the sides of the brush block, the work point on the brush will not be displaced from the longitudinal axis of the tool, since such work point is in the axis of rotation of the head. Angular movement of head 173, therefore, does not affect the depth to which the tuft will be set within the brush block, but such depth is constant for all angular positions of the brush block.

In the same way, if carriage 190 be moved laterally with regard to head 173, the work point on the brush block will still remain in the axis of rotation of the head, and at the point of intersection of such axis with the longitudinal axis of the tool.

Furthermore, if the brush block support 198 be tilted to different angles to obtain an increased inclination of the tufts at the ends of the brush block, links 196 control the angular movement of the brush block support 198 in such a manner that the point on the brush block which is in line with the tool, is maintained in the axis of rotation of head 173 for all positions of the brush block; or, in other words, links 196 control the movement of the brush block support in such manner that the work point on the brush block is always at a certain point along the path of movement of the tool, whereby the tufts are set to the same depth in each instance. In order to adjust the clamping plates 200 and 201 we provide a screw 201$^a$ which is threaded in the clamping plates 200 and 201, and which has a collar 201$^b$ fitting between stationary cross bars 201$^c$ secured on the rods 199. A handle 201$^d$ is located on the screw 201$^a$ to move the same. The cams 182 and 182$^a$ have the same shape as and operate in the same manner as the cams 181 and 181$^a$. The parts just described enable the brush block 204 to be shifted transversely from the position of one tuft to another, but in addition means is provided, for changing the inclination from the center of the brush towards the ends thereof, by changing the angle of the brush block 204 accordingly. This is accomplished by means of gear teeth 173$^m$ on the hollow plunger 173 which are in mesh with a gear 207 (Fig. 14) on a shaft 208, having a bevel gear 209 in mesh with a gear sector 210 on a shaft 211, which is arranged to be moved by a lever 212 (Fig. 7) connected to a bell crank lever 213 by means of an adjustable pivot 214 which is arranged to be tightly secured to the lever 213 but to be slidable in a slot 215 on the lever 212. The lever 213 is connected by a link 216 to the end of rack 183. The arrangement of these parts is such that the lateral shifting mechanism is in a position neutral to the movement of the lateral angle changing devices. At the same time, the movement of the same rack 183 accomplishes the shifting of the brush block 204 transversely and provides the necessary angles for the tufts according to the distance the latter are located away from the centers of the brush block.

Not only is the brush block 204 shifted crosswise of the machine in such a manner as to move the block from the position of one tuft to another and so as to provide the necessary angles for the individual tufts, but the brush block is shifted bodily in a vertical direction as already described so as to move the block from the position of one tuft to that of another and in addition the angles of the tufts in a vertical direction are changed according to the distance of the tufts from the center of the brush. The changing of the angles of the tufts in a vertical direction is made possible by the manner of supporting the brush block 204 upon the links 196, which are pivoted in the holes 195. In order to move the brush block 204 and the links 196 to obtain this change in angle vertically, there is a plate 217 (Fig. 14) attached to the bottom of the bars 201$^c$. This plate 217 rests upon a finger 218 carried on a guide rod 219 (Fig. 21) and which is connected by an arm 220 to a plunger 221, both the guide rod 219 and plunger 221 being supported for vertical movement in the bracket 194. The lower end of the plunger 221 is arranged to rest and slide upon a plunger 222, which is carried in the bushing 185$^a$ and the lower end of said plunger 222 rests upon a plate 223 which is fastened to a cylindrical rack 224 arranged to be operated by a gear 224$^a$ on a shaft 224$^b$, one end of which is journaled in the bushing 185$^a$ and the other end of which is supported in the casting 186$^a$. Attached to the gear 224$^a$ there is a bevel gear 224$^c$ which meshes in turn with a bevel gear 224$^d$ surrounding the bushing 185$^a$ and carrying a gear 224$^e$ arranged to mesh with a rack 225, connected to a lever 226 (Fig. 8) by an adjustable link 227 similar to the link 184. The lever 226 is moved by the cams 182 and 182$^a$.

In order to move the racks 183 and 225 the proper degree to bring about the movement of the brush block necessary for the insertion, of a particular tuft at a particular point of the brush, mechanism is provided which operates in such a manner as to set the parts for the proper degree of movement. The mechanism for setting the parts is controlled by the positions of the faces carried by a pattern or index wheel but in such a manner as to avoid placing the strain due to the shifting of the parts on the pattern or index wheel. The following mechanism is provided for this purpose. Once the racks 183 and 225 attached to the ends of the levers 185 and 226 have been moved into their proper position by the operation of the cams 181 and 181ª, 182 and 182ª, these racks are locked in position by means of plungers 228 and 229 (Fig. 7) between which there is interposed a movable wedge 230 pivoted to a movable arm 231 having an adjustable pin 232 riding upon a cam 233 on the shaft 166. The cams 181, 181ª, 182 and 182ª when at rest and supporting the levers 185 and 226 are so located as to position the levers 185 and 226 exactly midway between shafts 180 and 177. The difference in the positions of the racks 183 and 225 is therefore determined by the other ends of the levers 185 and 226. These ends of said levers are attached respectively to racks 234 and 235 (Figs. 6 and 9) having fingers 236 and 237 adapted to rest respectively upon index or pattern wheels 238 and 239 loosely carried by a shaft 240. These racks 234 and 235 are arranged to be moved by a cam 241 (Fig. 9) on the shaft 166, which operates against rollers 242 and 243 on a rack 244 meshing with gear teeth 245 on a shaft 246 which frictionally carries gears 247 and 248 meshing with the racks 234 and 235. Each of these gears 247, 248 is connected to the shaft 246 by an interposed friction ring 249 (Fig. 9) split into two parts which parts are carried upon pins 250, having beveled inner faces. Plungers 251 and 252 are pressed against said bevel faces by springs 253 and 254, which rest against screws 255 and 256. Once the racks 234 and 235 have been set they are locked in place by pins 257 and 258, which are operated by a plunger 259, adapted to be moved by a lever 260 having an adjustable pin 261, riding on a cam 262 (Fig. 6) carried by the shaft 177. Each of the index wheels 238 and 239 is comprised of a plurality of peaks 263 (Fig. 9), each of which is formed of a plurality of steps 264 on either side thereof. The steps 264 are designed to engage with the fingers 236 and 237, so as to position a tuft for each of the steps. This applies to all of the steps, except certain large steps 265, which are provided to move the holding mechanism for the brush block from the position of the last tuft in the brush to the position of the first tuft in the next brush block provided to have tufts inserted therein. Said steps 265 may be of any desired size. The index or pattern wheels 238 and 239 are driven by a ratchet wheel 266 having teeth corresponding respectively to each of the tufts to be inserted in the brush block. This ratchet wheel 266 is rotated by a lever 267 carrying a spring pressed pawl 268, said lever 267 being connected by a link 269 and an adjustable pivot 270 (Fig. 8) to a slotted lever 271, pivoted on the main frame 169. This lever 271 has a rearwardly directed arm 272 engaging lugs 273 on a collar 274 attached to the end of the shaft 246.

In order to stop the machine automatically when a brush has been completed the index or pattern wheel 238 carries lugs 275 and 276 which engage with levers 277 and 278, which are on concentric shafts 279 and 280, said shafts carrying arms 281 and 282 (Fig. 14) which are connected by links 283 and 284 to levers 285 and 286 (Fig. 1) located respectively on the shafts 26 and 30. In this way the clutches that control the tufting and the brush block moving mechanism are operated by the lugs 275 and 276 on the index wheel 238. The lugs 275 and 276 are ordinarily arranged so as to stop first the tufting mechanism and thereafter to stop the brush block shifting mechanism, although they may be arranged to bring them to a stop simultaneously, if desired.

In the operation of the invention, power is applied to the pulley 3 which may be connected with and disconnected from the machine by means of the clutch lever 7. By the operation of the clutch rods 29 and 33 either the tufting mechanism or the brush block shifting mechanism may be operated alone or they may be operated simultaneously. Furthermore, by the operation of the lever 34 both the tufting mechanism and the brush block shifting mechanism may be thrown into and out of operation simultaneously. Furthermore, when at any time it is desired to operate the tufting mechanism forwardly or rearwardly by hand this part of the mechanism may be disconnected from the remainder of the machine by operating the clutch handle 49, so that the crank 50ª may be applied to the shaft 50ᵇ for this purpose. A brush block 204 is inserted in the brush block shifting mechanism after links 196 of suitable length have been inserted to obtain the desired inclination of the tufts in a vertical plane. Index wheels 238 and 239 and a ratchet wheel 266 of a suitable character to produce a desired number of tufts located at the proper positions in the brush block are now inserted in the machine. A supply of bristles 79 is also inserted in the machine. Furthermore, a supply of anchors 122 is applied to the machine, the anchors having been punched out and filled into the magazine 122 by another machine, provided for this purpose. The machine will now operate to withdraw a tuft of bristles from the main supply 79 and move the same downward until it is located in front of the needle 119. Simultaneously, the brush block 204 is being shifted by the engagement of lever 171 with the depression in cam 170 (Fig. 9), so as to bring the same opposite to the drill 147 at the point where the tuft is to be inserted and the drill goes forward to drill the hole for the insertion of the tuft. When the drilling operation takes place the drill guide 158 comes into contact with the brush block and thereby prevents the drill from being displaced away from the intended position for the tuft. The needle 119 now goes forwardly, picks off an anchor from the magazine 122 and places the same adjacent to the tuft of bristles. While this is being done the locker 118 has also been moved into place to hold the tuft on the nozzle. The anchor and tuft of bristles are now brought forward in the nozzle by the simultaneous movement of the nozzle 117 and the needle 119. While this is being done the drill 147 is withdrawn and the brush block 204 is shifted upwardly by cam 170 and lever 171 and then downwardly until the drilled hole is opposite the nozzle 117 thus avoiding damage to the bristles already in the block, by the nozzle when inserting the next tuft. The folded tuft of bristles and the anchor are thereupon inserted in the drilled hole and the needle 119 spreads apart the wings of the anchor thus anchoring the tuft in the hole. During the insertion of the tuft in the brush block the picker comprising the casing 97 and the knife 100 are being returned to their upward position, thereupon the nozzle 117 and the needle 119 are withdrawn. When the nozzle 117 has been moved away from the brush block 204, the brush block is then simultaneously lowered to the position of the drill 147 by the engagement of lever 171 with the depressed portion of cam 170 and shifted to the necessary position for the new tuft to be inserted, by movement of levers 185 and 226. During the remainder of the cycle, that is to say, when the brush block 204 is not being lowered to a position of a new tuft to be inserted, the index or pattern wheels 238 and 239 are being shifted so as to move the parts necessary to position the brush block moving mechanism for the insertion of the succeeding tuft. It will be understood, however, that the index or pattern wheels 238 and 239 are moved to position the racks 234 and 235 and that thereupon these racks are locked in position. In this way the rear ends of the levers 185 and 226 are positioned while the racks 183 and 224 which are attached to the other ends of said levers are locked in position by the locking wedge 230. Thereafter, the racks 234 and 235 are locked and the racks 183 and 224 are unlocked and the cams 181, 181ª, 182 and 182ª are then moved so as to exert sufficient force to shift the racks 183 and 224 thus shifting the brush block 204. In this manner the strain necessary for shifting the brush block 204 and the mechanism supporting the same is removed from the index or pattern wheels 238 and 239. When the last tuft has been inserted in the brush block 204, the tuft mechanism is first stopped automatically and the brush block 204 is then brought back to its initial position after which the brush block shifting mechanism is automatically stopped, the stopping being effected by the lugs 275 and 276 on the index or pattern wheel.

The machine is now in position for the insertion of another brush block for the filling of the same with tufts of bristles in the same manner.

While we have described our invention above in detail, we wish it to be understood that many changes may be made therein without departing from the spirit of our invention.

We claim:—

1. In a brush-making machine, a brush block support, shifting mechanism for said support adapted to impart predetermined movements thereto, actuating means for periodically moving said shifting mechanism, and devices independent of said actuating means for periodically adjusting said shifting mechanism to change the position to which said support will be moved when said actuating means is operated.

2. In a brush-making machine, a brush block support, shifting mechanism for said support comprising an oscillating lever having movement-transmitting members extending between the same and said support, means for periodically actuating said lever to move said support, and devices for periodically changing the position of said lever, whereby the position to which said support is moved is periodically changed.

3. In a brush-making machine, a brush block support, shifting mechanism for said support adapted to impart predetermined movements thereto, actuating means for periodically moving said shifting mechanism, devices for periodically adjusting said shifting mechanism to change the position to which said support will be moved when said actuating means is operated, and means for preventing movement of said support during the operation of said adjusting devices.

4. In a brush-making machine, a brush block support, shifting mechanism for said support comprising an oscillating lever having movement transmitting members extending between the same and said support, means for periodically rocking said lever to move said support, and devices for periodically adjusting the position of the pivot point of said lever to change the position to which said support will be moved by the operation thereof.

5. In a brush-making machine, a brush block support, shifting mechanism for said support comprising an oscillating lever having movement-transmitting members extending between the same and said support, means for periodically rocking said lever to move said support, and devices for periodically adjusting the position of the pivot point of said lever to change the position to which said support will be moved by the operation thereof, such devices including a longitudinally shiftable bar to which said lever is pivoted, and means for longitudinally shifting said bar.

6. In a brush-making machine, a brush block support, shifting mechanism for said support adapted to impart predetermined movements thereto, actuating means for periodically moving said shifting mechanism, an index wheel, and means controlled from said index wheel and independent of said actuating means for periodically adjusting said shifting mechanism to change the position to which said support will be moved when said actuating means is operated.

7. In a brush-making machine, a brush block support, shifting mechanism for said support adapted to impart predetermined movements thereto, an index wheel, devices controlled from said wheel for periodically adjusting said shifting mechanism to impart different movements to said support, and means for locking said support against movement during the operation of said adjusting devices.

8. In a brush-making machine, a brush block support, shifting mechanism for said support comprising an oscillating lever having movement - transmitting members extending between the same and said support, actuating mechanism for periodically shifting said lever to move said support and independent of the hereafter-named member, an index wheel, a member engaging said lever, and friction driving elements urging said last - mentioned member into contact with said index wheel.

9. In a brush-making machine, a brush block support, shifting mechanism for said support comprising an oscillating lever having movement-transmitting members extending between the same and said support, cam mechanism for periodically shifting said lever to move said support and independent of the hereafter-named member, an index wheel, a member engaging said lever, and friction driving elements urging said last-mentioned member into contact with said index wheel.

10. In a brush-making machine, a brush block support, shifting mechanism for said support comprising an oscillating lever having movement-transmitting members extending between the same and said support, cam mechanism for periodically shifting said lever to move said support, an index wheel, a member engaging said lever, friction driving elements urging said last-mentioned member into contact with said index wheel, and means for locking said last-mentioned member in fixed position during the operation of said cam mechanism.

11. In a brush-making machine, a brush block support, shifting mechanism for said support comprising an oscillating lever having movement-transmitting members extending between the same and said support, cam mechanism for periodically shifting said lever to move said support, an index wheel, a member engaging said lever, friction driving elements urging said last-mentioned member into contact with said index wheel, means for locking said last-mentioned member in fixed position during the operation of said cam mechanism, and means for locking said support against movement when the lock for said last-mentioned member is released.

12. In a brush-making machine, a brush block support, shifting mechanism for said support adapted to impart predetermined movements thereto, an index wheel, devices for adjusting said shifting mechanism according to the position of said index wheel to change the position to which said support will be moved when said shifting mechanism is operated, and means for relieving said wheel from the strains incident to the operation of said shifting mechanism.

13. In a brush-making machine, a movably mounted plunger, means for imparting rotary and reciprocatory movements thereto, a carriage mounted thereon, a brush block support mounted upon said carriage, and means for sliding said carriage on said plunger in a direction at an angle to the reciprocatory movement of said plunger, thereby to impart to said support and the carried brush block a movement angular to said reciprocatory movement.

14. In a brush-making machine, a movably mounted plunger, means for imparting rotary and reciprocatory movements thereto, a carriage mounted thereon, means for sliding said carriage on said plunger in a direction at an angle to the reciprocatory movement of said plunger, and a brush block support mounted on said carriage, said brush block support being angularly movable in a plane at an angle to the plane of rotation of said plunger.

15. In a brush-making machine, a movably mounted plunger, means for imparting reciprocatory and rotary movements thereto, a carriage slidably carried by said plunger, a brush block support mounted upon said carrier, and members within the interior of said plunger transmitting sliding movements to said carriage, thereby to move said support and the carried brush block.

16. In a brush-making machine, a movably mounted plunger, means for imparting reciprocatory and rotary movements thereto, a carriage slidably mounted on said plunger to move in a plane at an angle to the plane of reciprocation of said plunger, a brush block support mounted on said carriage to swing in a plane at an angle to the plane of rotary movement of said plunger, and members within the interior of said plunger transmitting sliding movements to said carriage and adapted to swing said brush block support.

17. In a brush-making machine, a movably mounted plunger, a carriage slidably carried thereby, a brush block support movably mounted on said carriage, sliding racks adjacent said plunger, and members within such plunger transmitting motion from said racks respectively to said carriage and brush block support.

18. In a brush-making machine, a movably mounted plunger, a brush block support supported therefrom, a drill and tufter adapted to operate on said brush block, and means for periodically moving said plunger to shift the brush block back and forth between the drill and the tufter.

19. In a brush-making machine, a drill and tufter, both reciprocable along fixed paths, a brush block support, mechanism for shifting the position of said support to bring different points on the brush holder into position to be drilled and tufted, and means for moving said support back and forth to present each of such points on the brush block successively to the drill and tufter.

20. In a brush-making machine, a drill and tufter, both reciprocable along fixed paths, a brush block support, mechanism for shifting the position of said support to present different points on the brush block to the drill, and to effect different inclinations of the brush block to the drill, and mechanism for moving said support to present such points successively to the tufter while maintaining a similar inclination of the brush block to the tufter.

21. In a brush-making machine, a movably mounted plunger, a carriage slidably carried thereby, a brush block support supported from said carriage, means for sliding said carriage with regard to said plunger, and means for rotating said plunger an amount proportional to the distance through which said carriage is moved by the operation of said sliding means.

22. In a brush-making machine, a movably mounted plunger, a carriage slidably carried thereby, a brush block support supported from said carriage, means for sliding said carriage with regard to said plunger, means for rotating said plunger an amount proportional to the distance through which said carriage is moved by the operation of said sliding means, and means for adjusting the amount said plunger will be rotated with a given sliding movement of said carriage.

23. In a brush machine, a brush block holder, movable means for carrying and supporting said holder, provisions for movably connecting said holder and means, a lifting rod for moving said holder as provided for by said provisions, said movable means and rod being relatively located for angular movement with respect to each other, and a contact plate carried with said holder for cooperation with said rod to operatively connect said holder and rod, said plate extending in the line of movement of said movable means whereby said plate maintains the cooperative relation of said rod and said holder during the movement of said holder with said movable means.

24. In a brush machine, a brush block holder, movable means for carrying and supporting said holder, links for movably connecting said holder and means, a lifting rod for moving said holder as provided for by said links, said movable means and rod being relatively located for angular movement with respect to each other, and a contact plate carried with said holder for cooperation with said rod to operatively connect said holder and rod, said plate extending in the line of movement of said movable means whereby said plate maintains the cooperative relation of said rod and said holder during the movement of said holder with said movable means.

25. In a brush-making machine, a tool for operating on a brush block and shiftable along a fixed path, a plunger mounted to rotate about an axis intersecting the path of movement of said tool, a brush block support supported from said plunger to permit angular movement of said support in a plane at an angle to the plane of rotation of said plunger, means for so supporting said support, and means controlling the angular movement of said support, said supporting and said controlling means being cooperatively related to maintain the point on the brush block carried by said support which is in the path of the tool substantially at the intersection of the plunger axis and such path, in different angular positions of said brush block support.

26. In a brush making machine, a brush block support, shifting mechanism for said support adapted to impart predetermined movements thereto, actuating means for periodically moving said shifting mechanism, devices for periodically adjusting said shifting mechanism to change the position to which said support will be moved when said actuating means is operated, means for preventing movement of said support while said adjusting devices are being operated, and means for preventing adjustment of said shifting mechanism while said actuating means is being operated.

27. In a brush making machine a brush block support, shifting mechanism for said support adapted to impart predetermined movements thereto, actuating means for periodically moving said shifting mechanism, devices for periodically adjusting said shifting mechanism to change the position to which said support will be moved when said actuating means is operated, and means for preventing movement of said adjusting devices during the operation of said actuating means.

28. In a brush making machine, a brush block support, shifting mechanism for said support adapted to impart predetermined movements thereto, means for alternately actuating said shifting mechanism to move said support and adjusting said shifting mechanism to change the position to which said support will be moved by the operation of said shifting mechanism, means for alternately locking said shifting mechanism, and adjusting means against movement.

29. In a brush-making machine, a brush block support, shifting mechanism for said support adapted to impart predetermined movements thereto, means for actuating said shifting mechanism to move said support, means for adjusting said shifting mechanism to change the position to which said support will be moved by the shifting mechanism, means operatively associating said actuating means and said adjusting means for alternate operation, means for locking said shifting mechanism, means for locking said adjusting means, and means operatively associating said two locking means for alternate operation.

30. In a brush making machine a brush block support, a drill and tufter adapted to operate on a brush carried by said support, and means operable after each operation of the drill upon the brush for moving said brush support to present the drilled point on the brush block to the tufter.

31. In a brush making machine a slidably mounted carriage, a brush block support supported from said carriage, means for sliding said carriage to impart bodily movement to said support, and means operable upon reciprocatory movements of said carriage, for producing an angular movement of said support proportional to the distance to which the carriage is moved from the central position of its reciprocatory movements, and means for adjusting the angle through which said support will turn with a given reciprocatory movement of said carriage.

32. In a brush making machine a tool for operating on a brush block, a brush block supporting structure, said tool and structure being mounted for relative reciprocative movement upon the longitudinal axis of the tool, said structure comprising a head rotatable about an axis intersecting the longitudinal axis of said tool, a carriage slidably mounted on said head, and means for supporting a brush block from said carriage with its work point substantially at the intersection point of said above-mentioned axes, and means for sliding said carriage relative to said head to bring different points on the brush block to said intersection point.

33. In a brush making machine a tool for operating on a brush block, a brush block supporting structure, said tool and structure being mounted for relative reciprocative movement upon the longitudinal axis of the tool, said structure comprising a head rotatable about an axis intersecting the longitudinal axis of said tool, a carriage slidably mounted on said head, means for supporting a brush block from said carriage with its work point substantially at the intersection point of said above-mentioned axes, means for sliding said carriage relative to said head to bring different points on the brush block to said intersection point, and means for rotating said head through an angle proportional to the distance of said carriage from its central position with regard to the head.

34. In a brush making machine a tool for operating on a brush block, a brush block supporting structure, said tool and structure being mounted for relative reciprocative movement upon the longitudinal axis of the tool, said structure comprising a head rotatable about an axis intersecting the longitudinal axis of said tool, a carriage slidably mounted on said head, means for supporting a brush block from said carriage with its work point substantially at the intersection point of said above-mentioned axes, means for sliding said carriage relative to said head to bring different points on the brush block to said intersection point, means for rotating said head through an angle proportional to the distance of said carriage from its central position with regard to the head, and means for reciprocating said head along its axis.

35. In a brush making machine, a tool for operating on a brush block, a brush block supporting structure, said tool and structure being mounted for relative reciprocative movement upon the longitudinal axis of the tool, said structure comprising a head rotatable about an axis intersecting the longitudinal axis of said tool, a carriage slidably mounted on said head for travel transversely of the axis of the tool, a brush block support mounted on said carriage and angularly movable transversely of the axis of said tool, means for so mounting said support, and means controlling the angular movement of said support, said mounting and said controlling means being cooperatively related to maintain the work point on the brush block substantially at said intersection point for different angular positions of said support.

36. In a brush making machine a tool for operating on a brush block, a brush block supporting structure, said tool and structure being mounted for relative reciprocative movement upon the longitudinal axis of the tool, said structure comprising a head rotatable about an axis intersecting the longitudinal axis of said tool, a brush block support mounted to permit angular movement transversely of the axis of said tool, means for so mounting said support, and means for controlling the angular movement of said support, said mounting and said controlling means being cooperatively related to maintain the work point on the brush block substantially at said intersection point for different angular positions of said support.

37. In a brush making machine a tool for operating on a brush block, a brush block supporting structure, said tool and structure being mounted for relative reciprocative movement upon the longitudinal axis of the tool, said structure comprising a head rotatable about an axis intersecting the longitudinal axis of said tool, a brush block support mounted to permit angular movement transversely of the axis of said tool, means for so mounting said support, means for controlling the angular movement of said support, said mounting and said controlling means being cooperatively related to maintain the work point on the brush block substantially at said intersection point for different angular positions of said support, and means for reciprocating said head along its axis.

38. In a brush making machine a tool for operating on a brush block, a supporting structure, said tool and structure being mounted for relative reciprocative movement upon the longitudinal axis of the tool, said structure comprising a head rotatable about an axis intersecting the longitudinal axis of the tool, and means for supporting a brush block from said head with its work point substantially at the above-mentioned intersection point.

39. In a brush making machine, a bristle inserting mechanism, a brush block positioning mechanism adapted to present the points on the brush block to be tufted to said inserting mechanism, means for throwing said bristle inserting mechanism out of action after the last tuft has been inserted, and means for throwing said positioning mechanism out of action after the same has been moved from the position in which the last tuft was inserted, to the position for the insertion of the first tuft.

40. In a brush making machine, a bristle inserting mechanism, a brush block positioning mechanism adapted to present the points on the brush block to be tufted to said inserting mechanism, an index wheel controlling the movements of said positioning mechanism, clutches respectively for throwing said mechanisms out of action, and tripping members on said index wheel adapted respectively to actuate the inserting mechanism clutch after the last tuft has been inserted, and to actuate the positioning mechanism clutch after the positioning mechanism has been moved from the position in which the last tuft was inserted to the position for the insertion of the first tuft.

41. In a brush making machine a tool for operating on a brush block, a brush block support adapted to position a brush block in line with said tool, said tool and support being mounted for relative reciprocative movement upon the longitudinal axis of the tool, and means for producing circular movements of said support about an axis passing substantially through the point of intersection of the longitudinal axis of the tool with the surface of the brush block.

42. In a brush making machine a tool for operating on a brush block, a brush block support adapted to position a brush block in line with said tool, said tool and support being mounted for relative reciprocative movement upon the longitudinal axis of the tool, means for producing circular movements of said support about an axis passing substantially through the point of intersection of the longitudinal axis of the tool with the surface of the brush block, and means for sliding such support in a plane also passing substantially through said intersection point.

43. In a brush making machine a tool for operating on a brush block, a brush block support adapted to position a brush block in line with said tool, said tool and support being mounted for relative reciprocative movement upon the longitudinal axis of the tool, means for producing circular movements of said support about an axis passing substantially through the point of intersection of the longitudinal axis of the tool with the surface of the brush block, means for sliding such support in a plane also passing substantially through said intersection point, and means for tilting said support in a plane substantially perpendicular to the plane of its aforesaid circular movements while maintaining the point on the surface of the brush block which is in the longitudinal axis of said tool substantially at said above-mentioned intersection point.

44. In a brush making machine a support, shifting mechanism adapted to impart predetermined movements thereto, actuating means for periodically moving said shifting mechanism, devices for adjusting said shifting mechanism to change the point to which said support will be moved when said actuating means is operated, and means for relieving said devices from the strains incident to movement of said shifting mechanism.

In testimony that we claim the foregoing we have hereunto set our hands.

EVARTS G. LOOMIS.
LEONARD B. TERHUNE.

Witnesses:
IDA W. PEARSON,
LEON G. CONWIER.